United States Patent

[11] 3,587,503

| [72] | Inventor | Eugen Stehr<br>Hindenburgdamm 55, Berlin, Germany |
|---|---|---|
| [21] | Appl. No. | 804,843 |
| [22] | Filed | Mar. 6, 1969 |
| [45] | Patented | June 28, 1971 |

[54] MEANS FOR CONSTRUCTING BUOYANT PLATFORMS
4 Claims, 8 Drawing Figs.

[52] U.S. Cl. .................................... 114/0.5,
61/48
[51] Int. Cl. .................................... B63b 35/00,
E02b 17/00
[50] Field of Search .................................... 114/0.5, 0.5
(F), 43.5; 61/48; 52/(Inquired)

[56] References Cited
UNITED STATES PATENTS
3,036,539  5/1962  Storey .................... 114/0.5(F)
FOREIGN PATENTS
933,678  9/1955  Germany .................... 114/0.5(F)

Primary Examiner—Trygve M. Blix
Attorney—Karl F. Ross

ABSTRACT: The invention provides means for constructing a single or multilayer bouyant platform from individual buoyant units which are designed on a modular basis and which can be coupled together edgewise by complementary tongues and grooves and face-to-face through self-aligning openings.

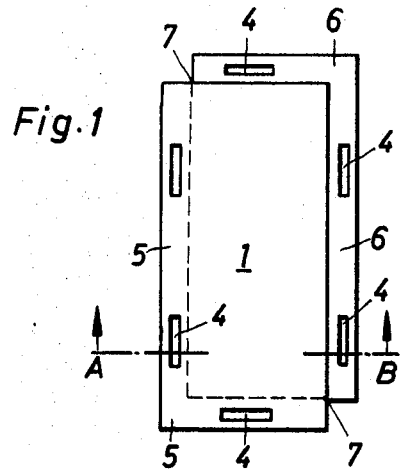
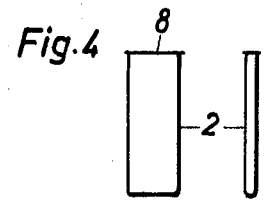
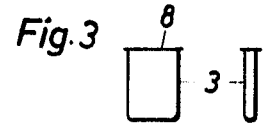
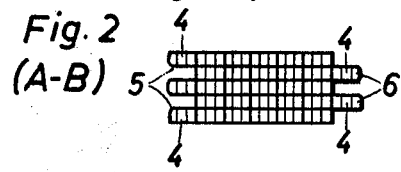
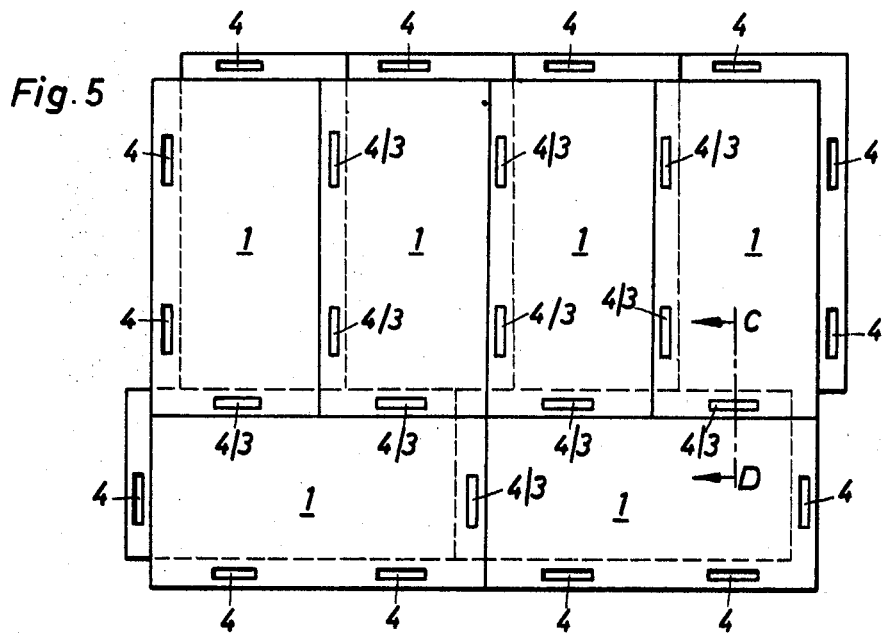

(C-D)

PATENTED JUN 28 1971

Eugen STEHR
*Inventor:*
BY
Karl F. Ross
ATTORNEY

MEANS FOR CONSTRUCTING BUOYANT PLATFORMS

This invention relates to means for constructing single or multilayer buoyant platforms or rafts, from individual bouyant units, preferably made of plastics, which can be coupled together edge to edge to form a single-layer platform or face to face to form a multilayer platform.

In a known form of construction, rectangular buoyant units are employed, which have laterally projecting lugs, the lugs of adjacent floating units being adapted to interengage. The coupling of these units must be performed in a horizontal plane in a level configuration, raising difficulties during an assembly operation on water. If several layers of individual units are arranged one above another to produce a buoyant platform or float, the units of the separate layers can merely be placed in congruence above each other in view of the structure of the coupling lugs, thus forming gaps, continuous from the top to the bottom of the structure, which affect the compound stability of a multilayer platform. Also, owing to the presence of the coupling lugs an opening is formed in the surface of the platform at the points of intersection of the coupling lugs resulting in a discontinuous platform surface so that it is necessary to install a continuous floor covering over the surface.

In another known form of construction, prismatic buoyant units are employed, which are joined together to form a platform. These units have projecting lugs on their longitudinal sides, so that the lugs of adjacent units interengage. The coupling of the units is performed by means of coupling rods inserted vertically through the lugs. If several individual floating units are positioned above each other to form a buoyant platform, the individual units must also in this case be positioned one above another congruently in plan view, and joined to each other, so that vertical through-holes are formed in the case of a multilayer structure which holes affect the strength of the platform. Moreover intensive clamping actions can arise at the points of connection owing to the tendency of the individual units standing on edge to tip, and this can increase the difficulty of dismantling on the water. A continuous surface cannot be obtained in this case either, so that it is here too necessary to install a special floor plate when the platform is to be walked upon.

In known floating platforms or rafts, the coupling elements consist of rods having a relatively small cross section, so that the rods can be inserted into the coupling lugs. To ensure reliable cohesion between the separate floating units, the rods must accordingly consist of a material of sufficient strength, preferably of metal; and accordingly during the dismantling of a floating platform on the water, the possibility arises that these coupling rods may be lost.

The present invention consists in a buoyant unit adapted to be coupled to a like unit or units to form a buoyant platform said unit having a substantially rectangular plan shape whose length is a multiple of its width, complementary tongue and groove means on opposed edges of the unit for coupling units together to form a platform and complementary openings formed through the tongue and groove means for accepting coupling elements.

With this arrangement, individual units can be coupled together on a modular basis in parallel or transversely to each other by coupling elements inserted through the openings to form a single-layer platform and multilayer platforms can be formed with the units of adjacent layers being relatively staggered and the opening always being in alignment because of the modularity of the units. Adjacent layers can be connected together with coupling elements inserted in the aligning openings of the layers which elements have a length substantially equal to twice the height of the individual units.

The openings in the units and the coupling elements insertable therein can be designed so that the end faces of the coupling elements extends flush with the surface of the individual units. To this end the openings can be countersunk and the coupling elements be formed with corresponding heads received in the countersink.

It is possible for the individual units of one platform layer to be staggered in the longitudinal direction as well as in the transverse direction; and where several layers of individual units are positioned above each other, the units of adjacent layers may also be staggered relative to each other. In view of the staggered arrangement of the individual units, a platform can be formed with no gaps traversing all the layers. As a result of the incorporation of the coupling openings in the grooves and tongues of the individual units, in a modular manner the coupling openings are always situated above each other in multilayer platform even in a staggered arrangement. Where several layers are assembled, two adjacent layers may be joined by means of coupling elements of twice the height of one layer. The assembly of a multilayer platform may be effected by initially coupling the individual floating units of one layer with appropriate staggering of these units, by insertion of coupling elements corresponding in height to the layer height, into the coupling openings, with certain coupling openings (intended to receive the coupling elements of twice the height of the layer for connecting the reset layer) being left unoccupied. The assembly of the platform is performed from layer to layer, in this manner, and the platform thus produced possesses good strength characteristics since there are no gaps passing through all the layers. Also the assembly of the platform is facilitated by the absence of coupling elements passing through all the layers. The coupling openings and the coupling elements can have a relatively large cross section and they may be in the form of buoyant elements, so that loss is unlikely during assembling and dismantling on the water. By virtue of the relative displacement possible between the floating units according to the invention, within one layer as well as from layer to layer, the individual floating units may be relatively small in their dimensions, since a stable continuous platform is formed in each case upon assembling the individual floating units. The individual floating units may for example have dimensions of 1×2 m. and may accordingly be assembled into small or large platforms.

The invention will now be described by way of an example with reference to the accompanying drawing in which:

FIG. 1 is a plan view of a buoyant unit equipped with tongue and groove means according to the invention;

FIG. 2 is a cross section along the line A—B of FIG. 1;

FIG. 3 shows in front and side view a coupling element corresponding in height to the height of a unit;

FIG. 4 shows in front and side view a coupling element corresponding in height to the height of two units;

FIG. 5 is a plan view of a single-layer platform made up of six individual units;

Figure 6:
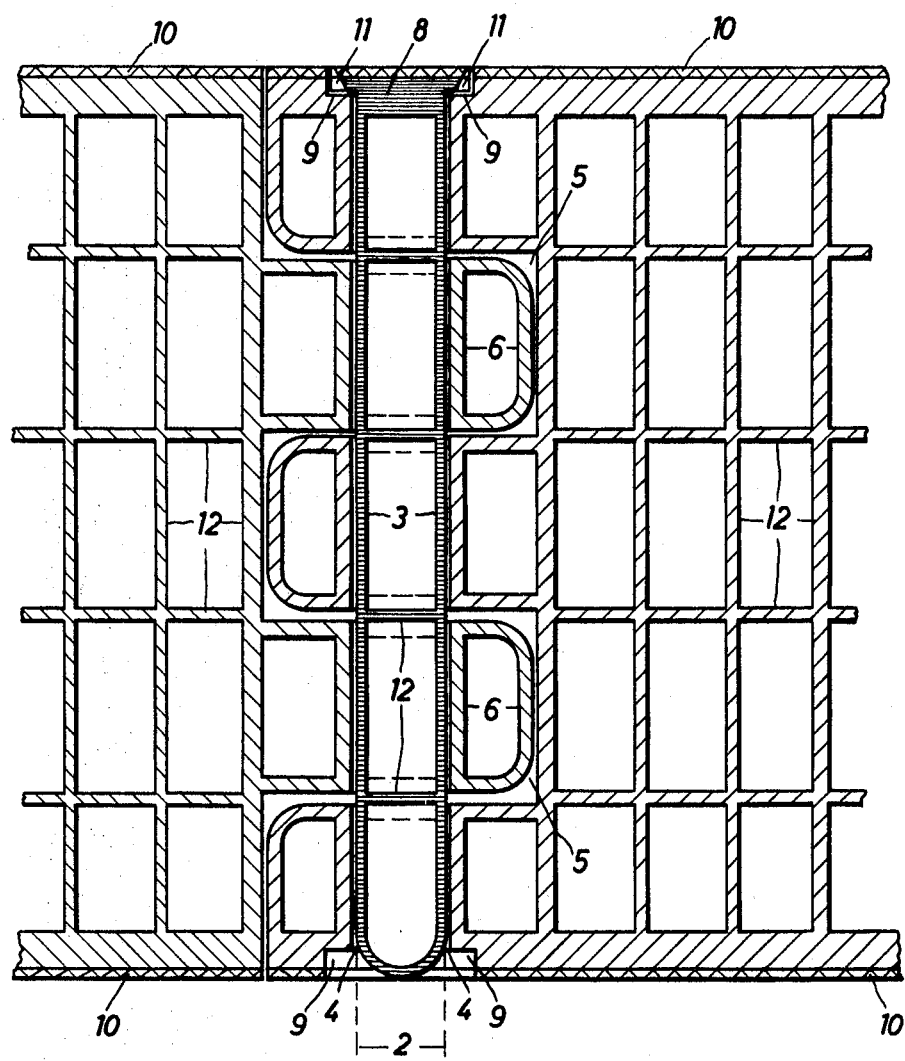
FIG. 6 is an enlarged section along the line C—D of FIG. 5.

FIGS. 1 and 2 show an individual buoyant unit 1 according to the invention, whose length is equal to twice its width. As apparent from FIGS. 1 and 2, two grooves 5 one below the other, are formed in two adjacent sides of the individual floating unit 1 and complementary tongues 6 having a width corresponding to the depth of the groves 5, are formed on the other two adjacent sides of the unit. The outer edges of tongues 6 and the roots of grooves 5 define a rectangle which is of the same dimensions as the outline of the member on which the tongues and grooves are provide. The tongues 6 ambilaterally terminate at the base 7 of the grooves 5. Complementary rectangular coupling openings 4 are formed through the grooves 5 and tongues 6, the arrangement being such that the openings are brought into alignment registry with each other when the individual floating units 1 are joined together. When assembling a single-layer floating platform, coupling elements according to FIG. 3 are inserted into the coupling openings 4 of the individual floating units 1 fitted together, as shown in FIG. 6. The coupling openings are equipped with countersunk ends 9, and the coupling elements 3 have a head 8 which carries a step projection 11 fitting in the countersink. The heads 8 of the coupling elements 3 accordingly terminate flush with the surface of the individual floating units 1, so that an uninterrupted platform surface results. So that the coupling elements 3 may be removed from the coupling openings 4, narrow slit-shaped incisions are formed in the heads 8, which make it possible to pull the coupling elements 2, 3 out by means of pincers or hooks appropriate for this purpose.

Figures 7, 8:
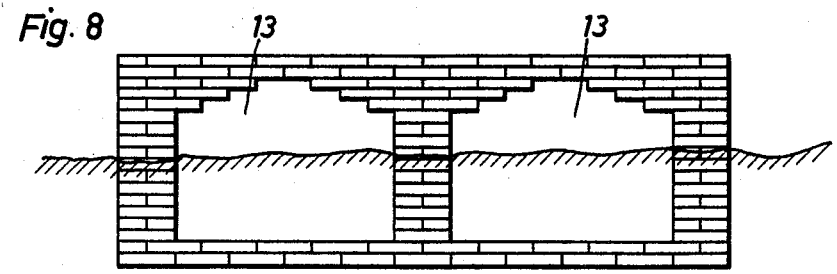
FIG. 7 shows in plan view several platform layers adapted to be attached one above another to form a multilayer platform.
FIG. 8 is a diagrammatic side view of a floating platform formed of a multiplicity of layers.

FIG. 4 shows a coupling element 2 having a height corresponding to twice the height of one unit. These coupling elements 2 are employed if a multilayer platform is to be assembled according to FIG. 7. FIG. 7 shows the layers S1, S2, S3, S4 in partial illustration. Layer S1 is initially formed by fitting individual floating units 1 together. Single-layer coupling elements 3 are inserted into the openings 4 marked in the FIG. by a line, while the coupling openings marked 0 are left unoccupied, the individual units of the layer 1 being thus joined together into a cohesive platform. After completion of the layer S1, the individual floating units 1 of the layer S2 are laid thereon in the staggered arrangement illustrated, single-layer coupling elements 3 again being inserted into the coupling openings 4 marked by a line, whereas the coupling openings 4 of layer S2 marked U have two-layer coupling elements 2 inserted in them, which engage in the coupling openings 4 of the layer S1 marked by the letter O, and thus interconnect the two layers S1 and S2. The individual floating units of the layer S3 are thereupon laid on the layer S2 in the staggered pattern shown, single-layer coupling elements 3 again being inserted into the coupling openings 4 marked by a line, whereas the coupling openings 4 marked by the letter U have two-layer coupling elements 2 inserted in them, which engage in the coupling openings 4 of the layer S2 which are marked by the letter O. The individual floating units 1 of the layer S4 are then laid on the layer S3 in the staggered pattern shown, again with insertion of single-layer coupling elements 3 into the coupling openings 4 marked by a line and of two-layer coupling elements 2 into the coupling opening 4 marked by an O, the latter elements engaging in the coupling opening 4 of the layer S3 which are marked by an O. In this way, the layers S1, S2, S3, S4 are firmly held together individually as well as between layers, without requiring coupling elements penetrating all the layers. If a multilayer platform is required to carry heavy loads, the single floating units 1 shown in the layer S1 may again be laid on the layer S4, repeating the layer sequence S1 to S4 once or several times. In this way, it is possible to assemble a floating platform for reception of heavy loads, which consists of an optional number of layers which are inherently cohesive and interconnected.

In diagrammatic illustration, FIG. 8 shows the possibility of incorporating cavities 13 in a platform formed by a considerable number of layers for receiving heavy loads the cavities being intended to render the platform less sensitive to wave impact.

As apparent from FIG. 6, the individual floating units 1 consisting of hollow elements may be made of synthetic plastics and may be equipped internally with intersecting longitudinally and transversely extending reinforcing webs 12 to increase the inherent strength of the floating unit 1. As shown by FIG. 6, transversely extending reinforcing partitions 12 may also be situated in the coupling elements 2, 3.

Since the coupling openings situated at the periphery of the layers S1 to S4 do not receive coupling elements 2, 3, these unoccupied coupling openings 4 offer a grip for the carrying or handling of the layers; moreover, they offer the possibility of lashing "heaving" anchors for mooring the floating platform; or external struts intended to carry a canopy or a rail may also be inserted into the unoccupied coupling openings 4.

I claim:

1. A floating platform comprising a plurality of contiguously interconnected buoyant units, each of said units having a substantially rectangular plan outlined and a length which is an integral multiple of its width, laterally extending tongues projecting from a pair of adjoining edges of the unit and extending substantially the entire length of the corresponding edge, each unit being further provided with recesses in the other pair of adjoining edges and substantially over the entire length of each of said other pair of edges for complementarily receiving such tongues, said tongues being provided with throughgoing slots and said units each being provided along said other edges with throughgoing slots registerable with the slots of tongues of adjoining units received in the recesses, and generally flat connecting members received in the registering slots of each pair of contiguously adjoining units.

2. The platform defined in claim 1, wherein a plurality of layers of such units are provided in superposed relation with the slots of superposed units registering with one another, at least some of said members having a length equal approximately to twice the thickness of each unit and traversing the registering slots of two superposed units.

3. The platform defined in claim 1, wherein a plurality of slots are provided along one longitudinal edge of each of said units with a center to center spacing corresponding to the width of the rectangular plan configuration.

4. The platform defined in claim 3, wherein each tongue comprises a plurality of tongue members and each recess comprises a plurality of grooves complementary with said tongue members, said slots along said other pair of edges being countersunk and the members traversing said slots being formed with heads receivable in the countersinks and lying flush with the surface of said units, said units having hollow interiors traversed by strengthening webs and being composed of synthetic resin.